United States Patent
Walmsley et al.

(10) Patent No.: US 6,605,806 B2
(45) Date of Patent: Aug. 12, 2003

(54) SYSTEM AND METHOD FOR GENERATING SIGNALS REPRESENTING INFRARED RADIATION

(75) Inventors: Charles F. Walmsley, Edinburgh (GB); Marcus L. Sutton, Gilbert, AZ (US)

(73) Assignee: Litton Systems, Inc., Woodland Hills, CA (US)

(*) Notice: Subject to any disclaimer, the term of this patent is extended or adjusted under 35 U.S.C. 154(b) by 0 days.

(21) Appl. No.: 09/976,751

(22) Filed: Oct. 12, 2001

(65) Prior Publication Data

US 2002/0084413 A1 Jul. 4, 2002

Related U.S. Application Data

(60) Provisional application No. 60/240,527, filed on Oct. 13, 2000.

(51) Int. Cl.[7] ............................................. G01J 5/06
(52) U.S. Cl. ....................... 250/332; 250/350; 348/164
(58) Field of Search ................................. 250/332, 340, 250/341.4, 350, 351; 348/164, 165

(56) References Cited

U.S. PATENT DOCUMENTS

| | | | |
|---|---|---|---|
| 4,048,500 A | * 9/1977 | Moore | 250/350 |
| 4,806,761 A | 2/1989 | Carson et al. | |
| 4,963,963 A | 10/1990 | Dorman | 358/113 |
| 5,126,552 A | 6/1992 | Hayes, Jr. | |
| 5,185,519 A | 2/1993 | Hayes, Jr. | |
| 5,324,944 A | * 6/1994 | Soch et al. | 250/338.3 |
| 5,489,776 A | * 2/1996 | Lung | 250/332 |
| 5,512,748 A | * 4/1996 | Hanson | 250/332 |
| 5,528,035 A | 6/1996 | Masarik et al. | 250/338.3 |
| 5,591,973 A | * 1/1997 | Masarik et al. | 250/332 |
| 5,610,389 A | 3/1997 | Asatourian | |
| 5,665,959 A | 9/1997 | Fossum et al. | |
| 5,729,285 A | 3/1998 | Peterson et al. | 348/162 |
| 5,867,307 A | 2/1999 | Myers et al. | |
| 5,903,659 A | 5/1999 | Kilgore | |
| 5,981,950 A | 11/1999 | Wolny et al. | |
| 6,034,371 A | * 3/2000 | Kormos et al. | 250/351 |
| 6,108,121 A | 8/2000 | Mansell et al. | |
| 6,177,674 B1 | 1/2001 | Rutt et al. | |

OTHER PUBLICATIONS

PCT International Search Report in International Application No. 01/42623, dated Dec. 21, 2001, 3 pages.

Johnson, T.H., *"Lead Salt Detectors and Arrays PbS and PbSe"*, Reprinted from *Infrared Detectors*, Proc. SPIE vol. 443, pp. 296–321.

Kreider, et al., *"Multiplexed mid–wavelength IR long, linear photoconductive focal plane arrays"*, SPIE vol. 1488, Infrared Imaging Systems: Design, Analysis, Modeling, and Testing II, pp. 376–388.

Anton, Rafael C., *"Characteristics of uncooled Indium Antimonide photoconductors"*, Proc. of SPIE vol. 2552, pp. 592–601.

* cited by examiner

Primary Examiner—Constantine Hannaher
(74) Attorney, Agent, or Firm—Baker Botts L.L.P (57) ABSTRACT

A system and method for generating signals representing infrared radiation include the capability to provide a reference scene and an actual scene to a plurality of infrared detector elements arranged in a two-dimensional array, the detector elements being biased so that they produce a signal even when no infrared radiation is impinging thereon. The system and method further include the capability to receive a first signal representing the reference scene from one of the detector elements, receive a second signal representing the actual scene from the detector element, and remove the bias signal from the second signal. The system and method also include the capability to attenuate the remaining second signal, integrate the attenuated signal, and sample the integrated signal.

26 Claims, 4 Drawing Sheets

SYSTEM AND METHOD FOR GENERATING SIGNALS REPRESENTING INFRARED RADIATION

RELATED APPLICATION

This application claims the benefit of U.S. Provisional Application Serial No. 60/240,527, filed Oct. 13, 2000, entitled Two Dimensional Photoconductor Detector Readout Integrated Circuit (ROIC).

TECHNICAL FIELD OF THE INVENTION

The invention relates to infrared radiation detectors and, more particularly, to a system and method for generating signals representing infrared radiation.

BACKGROUND OF THE INVENTION

An infrared radiation detector responds to the thermal energy radiated by objects, such as animals, automobiles, and airplanes. This thermal energy is typically not visible to the human eye. Accordingly, by using an infrared radiation detector, objects that are not visible may be perceived and/or alternative views of visible objects may be obtained.

An infrared radiation detector may have a single detector element or an array (linear or two-dimensional) of detector elements. The detector elements produce electrical signals in response to infrared radiation, and the electrical signals are processed to produce useful information. For a single detector element observing a moving object, the processing typically relies on a fairly large alternating current (AC) coupling capacitor to remove the direct current (DC) bias component. For linear arrays of detector elements observing a moving object, a similar approach may be used because very few space restrictions exist in the scan direction. Moreover, the transconductance (the ratio of the input current to the output voltage) may be set low by using a capacitor with a large capacitance, which requires a fairly large capacitor. In addition, a large capacitor provides a single-pole filter to minimize noise. This same approach can be used for two-dimensional arrays observing a moving object, as long as the pitch (the spacing between the center of the pixels) is in the range of one-hundred microns.

Unfortunately, these techniques have several disadvantages when trying to apply them to a two-dimensional array that observes a relatively stationary scene. For example, using an AC coupling capacitor requires a high capacitance in order to observe slow moving objects. Such a capacitor would require a large amount of space, which may not be available in a two-dimensional array. Moreover, these techniques may be unable to observe a stationary scene. Typically, two dimensional arrays suffer from a combination of the following drawbacks, performance significantly below the theoretical detector limit, substantial production cost, and large pixel pitch.

SUMMARY OF THE INVENTION

The present invention provides systems and methods that substantially reduce or eliminate at least some of the disadvantages with the prior art. Accordingly, at least in certain embodiments, the present invention provides a system and method for generating signals representing infrared radiation detected by a small pitch, two-dimensional array of infrared detector elements observing a relatively stationery scene.

In certain embodiments, a system for generating signals representing infrared radiation includes a plurality of infrared detector elements and a system for determining the output of the detector elements. The infrared detector elements are arranged in a two-dimensional array and biased so that they produce a signal even when no infrared radiation is impinging thereon. The detector elements are operable to receive infrared radiation from a reference scene and an actual scene. The system for determining the output of the detector elements includes a bias signal remover, a signal attenuator, a signal integrator, and a signal sampler. The bias signal remover is operable to receive a first signal representing the reference scene from one of the detector elements and a second signal representing the actual scene from the detector element and remove the bias signal from the second signal. The signal attenuator is coupled to the bias signal remover and is operable to attenuate the remaining second signal. The signal integrator is coupled to the signal attenuator and is operable to integrate the attenuated signal. The signal sampler is coupled to the signal integrator and is operable to sample the integrated signal.

In particular embodiments, a method for generating signals representing infrared radiation includes providing a reference scene and an actual scene to a plurality of infrared detector elements arranged in a two-dimensional array, the detector elements being biased so that they produce a signal even when no infrared radiation is impinging thereon. The method also includes receiving a first signal representing the reference scene from one of the detector elements, receiving a second signal representing the actual scene signal from the detector element, and removing the bias signal from the second signal. The method additionally includes attenuating the remaining second signal, integrating the attenuated signal, and sampling the integrated signal.

The present invention has several technical features. For example, in particular embodiments, the invention allows autozeroing of detector elements' bias currents on an element by element basis. Accordingly, the invention is useful for arrays where the resistance of the detector elements varies. As another example, in certain embodiments, the invention can be implemented in limited space. Thus, the invention is useful for two-dimensional arrays of detector elements where spacing is confined. Moreover, this may enhance fill factor for the detector elements. As a further example, in some embodiments, the invention provides for integration of the signal from the detector elements, which allows for increased signal-to-noise ratio. As a still further example, in certain embodiments, the invention allows operation without cooling of the detector elements, which simplifies operation of the invention. As another example, in some embodiments, the invention provides a good dynamic range—the ratio between the point at which the detector saturates and the point at which the detector first begins to detect IR radiation—to be achieved. Thus, the invention allows a wide range of IR radiation to be detected. As still another example, in some embodiments, the invention is implementable using CMOS technology. Accordingly, the invention may be readily manufactured at reasonable cost.

Of course, some embodiments may contain one, some, or all of these technical features.

Other technical features will be readily apparent to those skilled in the art from the following figures, written description, and claims.

BRIEF DESCRIPTION OF THE DRAWINGS

The drawings described below provide a more detailed understanding of the present invention, especially when considered in light of the following written description, and of its technical features.

DETAILED DESCRIPTION OF THE INVENTION

Figure 1:
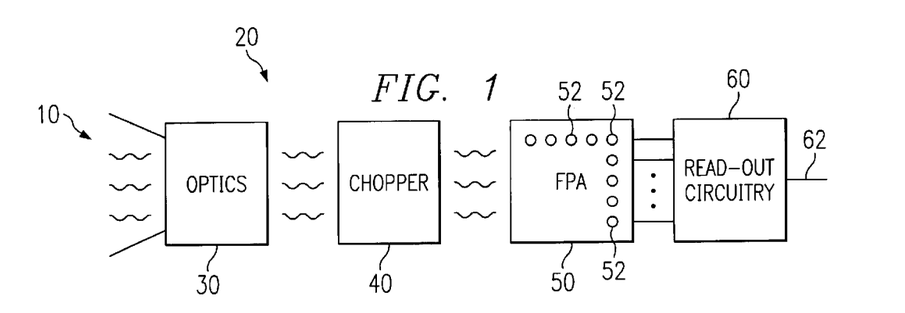
FIG. 1 illustrates a system for generating signals representing infrared radiation in accordance with one embodiment of the present invention.

FIG. 1 illustrates a system 20 for generating signals representing infrared radiation in accordance with one embodiment of the present invention. In general, system 20 receives infrared radiation 10 from a scene that is to be imaged and produces signals that represent the scene. As used herein, "infrared radiation" means any portion of the radiation emitted in the band between approximately seven-tenths of a micron and one-thousand microns.

As illustrated, system 20 includes optics 30, a chopper 40, a focal plane array (FPA) 50, and read-out circuitry (ROC) 60. Optics 30 gathers the infrared radiation and directs it toward chopper 40. Chopper 40 alternately allows the infrared radiation gathered by optics 30 and the infrared radiation of a reference scene, the chopper itself in this embodiment, to impinge upon FPA 50. FPA 50, which is composed of a plurality of detector elements 52 arranged in a two-dimensional array, detects the infrared radiation from the alternating actual scene and reference scene and produces signals representative of the infrared radiation in each scene. In general, detector elements 52 of FPA 50 may be composed of any type of material that changes resistance when infrared radiation impinges thereon. ROC 60 detects the signals from the detector elements 52 of FPA 50, processes them, and inserts the processed signals on a data link 62, so that they may be processed further, such as for image extraction or viewing on a display.

In operation, detector elements 52 have a potential applied to them and, thus, produce a current, known as a bias current, even when no infrared radiation is impinging upon them. The bias current may have the effect of making the detector elements more sensitive to infrared radiation. When radiation impinges on one of detector elements 52, the change in resistance manifests itself, according to Ohm's Law, as a change in current. The total current while imaging a scene, therefore, includes two components: 1) a bias current that is present when the scene is not being presented to the detector element; and 2) a signal current corresponding to the drop in detector resistance. The bias current is typically one-hundred times that of the signal current—a few hundred nanoAmps (nA) versus a few nA, for example.

While it is desirable to remove the bias current, since it is the signal current that is desired, there is, due to processing variations, a wide variation in detector element resistance values across FPA 50. Hence, it is probably not sufficient to extract a fixed current from each detector element 52, since even the residual current variations will probably swamp the signal current. Accordingly, the bias current may be subtracted adaptively on a detector element by detector element basis using an autozero technique. To accomplish this, chopper 40 is used to present a reference scene to detector elements 52. By storing the current generated by the detector elements 52 in response to the reference scene, this current may be subtracted from the current produced when chopper 40 allows the actual scene to impinge upon FPA 50, the difference representing the infrared radiation from the scene.

In order to ensure a good electrical interface between detector elements 52 of FPA 50 and ROC 60, it is beneficial to understand the behavior of detector elements 52 and, if possible, to develop an accurate electrical model, so that overall system performance may be readily simulated for any operating condition. The following discussion presents some of the basic equations for the operation of detector elements 52, and illustrates detector element performance over a range of detector dimensions and bias voltages.

Gain, G, is effectively the ratio of the carrier lifetime to the transit time, $$G = \frac{t_l}{t_t} \quad (1)$$

where $$t_t = \frac{v}{l} \quad (2)$$

where 1 is the detector length and v the carrier velocity, which is calculated from the product of the mobility, $\mu$, and the electric field, E (=$V_b$/1), where $V_b$ is the detector bias. Accordingly, $$G = \frac{\mu V_b t_l}{l^2} \quad (3)$$

The signal response R (expressed as Amps/Watt) is given by $$R = \eta G \frac{\lambda}{hc} \quad (4)$$

where η is the quantum efficiency, and λ the radiation wavelength.

The signal current, Isig, is given by $$Isig = Rw1H = \eta Gqw1\phi \quad (5)$$

where H is the incident radiation (expressed as Watts/cm$^2$), φ is the flux (expressed as photons/cm$^2$), and w and 1 are the detector width and length, respectively.

For an intrinsic detector, such as Lead-Sulfide (PbS) or Lead-Selenide (PbSe), for example, the conduction arises from photon excited carriers (signal and background) and from internal thermally generated carriers. The generation rate of thermal, $g_{th}$, and background excited carriers, $\eta\phi_b$, may be readily calculated from the dark resistivity, ρ, (detector resistance R=ρ1/w) as $$g_{th} + \eta\phi_b = \frac{1}{qpt_1\mu} \quad (6)$$

(expressed as cm$^{-2}$s$^{-1}$).

The total detector noise comprises both generation and recombination noise (the two events are uncorrelated, hence the factor of four in equation 7) arising from signal generated, background generated, and thermally generated carriers, 1/f noise and Johnson noise. Hence, the noise current, Inoise, is given by $$Inoise = \sqrt{4G^2q(q\eta(\phi_b + \phi_s) + qg_{th})wl\Delta f + \frac{4kT}{R}\Delta f + \frac{kI^2}{f}\Delta f} \quad (7)$$

and $$D^* = \frac{\sqrt{wl\Delta f}}{NEP} = R\frac{\sqrt{wl\Delta f}}{Inoise} \quad (8)$$

where NEP is Noise Equivalent Power, which is derived by referring the noise current back to the incident radiation. Typically, it is beneficial to design detectors to have the noise components dominated by detector element noise, as opposed to the processing electronics.

Unfortunately, the theoretical data does not match measured data for several significant factors, such as D*. Thus, measured data may also be generated to develop a good electrical model. The measured data for PbS detector elements, one type of detector element useful with the present invention, is illustrated in Tables 1–7. This data may be used to estimate overall system performance for the detector configuration described. The data is taken from square detectors with different areas, $A_d$, and is measured over different bias conditions, from which D* is calculated.

TABLE 1

| | | |
|---|---|---|
| Tsource | 500 | K |
| d | 0.508 | cm |
| 1 | 23.3 | cm |
| F | 45.87 | |
| Ω | 3.73E-04 | sr |
| WF | 0.325 | |
| Tw | 0.936 | |
| BbtoPk | 94 | |
| Hsource | 0.113 | Watts/cm$^2$/sr |
| Hdet | 1.36E-07 | Watts/cm$^2$ |
| Bandwidth | 160 | Hz |

TABLE 2*

| # | Bias V | R MΩ | Signal pA | Noise pA rms | Responsivity A/W | Noise pA/√Hz | D* cmVHz/W | Field V/cm |
|---|---|---|---|---|---|---|---|---|
| 10 | 1.03 | 2.80 | 127.8 | 10.4 | 10.18 | 0.82 | 1.189E+11 | 107.3 |
| | 2.02 | 2.80 | 245.0 | 22.7 | 19.52 | 1.79 | 1.044E+11 | 210.5 |
| | 3.02 | 2.80 | 383.5 | 30.8 | 30.56 | 2.43 | 1.204E+11 | 314.7 |
| | 4.01 | 2.80 | 510.9 | 36.6 | 40.71 | 2.89 | 1.350E+11 | 417.8 |
| | 5.02 | 2.80 | 629.3 | 42.8 | 50.14 | 3.38 | 1.422E+11 | 523.1 |
| 18 | 1.03 | 2.90 | 135.9 | 9.4 | 10.83 | 0.74 | 1.398E+11 | 107.3 |
| | 2.02 | 2.90 | 265.2 | 22.2 | 21.13 | 1.76 | 1.155E+11 | 210.5 |
| | 3.02 | 2.80 | 408.9 | 32.6 | 32.58 | 2.58 | 1.213E+11 | 314.7 |
| | 4.01 | 2.80 | 538.9 | 36.5 | 42.94 | 2.89 | 1.428E+11 | 417.8 |
| | 5.02 | 2.80 | 656.1 | 41.1 | 52.28 | 3.25 | 1.544E+11 | 523.1 |
| 22 | 1.03 | 2.80 | 142.3 | 10.8 | 11.34 | 0.85 | 1.274E+11 | 107.3 |
| | 2.02 | 2.80 | 267.9 | 21.0 | 21.35 | 1.66 | 1.234E+11 | 210.5 |
| | 3.02 | 2.80 | 413.2 | 34.4 | 32.92 | 2.72 | 1.162E+11 | 314.7 |
| | 4.01 | 2.80 | 541.1 | 36.4 | 43.11 | 2.88 | 1.438E+11 | 417.8 |
| | 5.02 | 2.80 | 689.0 | 46.1 | 54.90 | 3.64 | 1.446E+11 | 523.1 |
| 26 | 1.03 | 2.90 | 130.5 | 10.8 | 10.40 | 0.85 | 1.169E+11 | 107.3 |
| | 2.02 | 2.90 | 255.7 | 20.6 | 20.37 | 1.63 | 1.201E+11 | 210.5 |
| | 3.02 | 2.80 | 386.1 | 28.2 | 30.76 | 2.23 | 1.324E+11 | 314.7 |
| | 4.01 | 2.80 | 498.6 | 35.7 | 39.73 | 2.82 | 1.351E+11 | 417.8 |
| | 5.02 | 2.80 | 614.1 | 48.7 | 48.93 | 3.85 | 1.220E+11 | 523.1 |

*$A_d$ = 9.21E-05 cm$^2$

TABLE 3*

| # | Bias V | R MΩ | Signal pA | Noise pA rms | Responsivity A/W | Noise pA/√Hz | D* cm√Hz/W | Field V/cm |
|---|---|---|---|---|---|---|---|---|
| 1 | 1.03 | 1.70 | 136.9 | 13.9 | 13.01 | 1.10 | 1.040E+11 | 117.2 |
|   | 2.02 | 1.80 | 272.6 | 27.8 | 25.91 | 2.20 | 1.036E+11 | 229.9 |
|   | 3.02 | 1.80 | 413.1 | 41.9 | 39.27 | 3.31 | 1.042E+11 | 343.7 |
|   | 4.01 | 1.90 | 545.0 | 55.3 | 51.80 | 4.37 | 1.041E+11 | 456.4 |
|   | 5.02 | 2.00 | 680.7 | 69.1 | 64.70 | 5.46 | 1.041E+11 | 571.3 |
| 9 | 1.03 | 1.70 | 135.3 | 15.2 | 12.86 | 1.20 | 9.404E+10 | 117.2 |
|   | 2.02 | 1.80 | 270.5 | 23.3 | 25.71 | 1.84 | 1.226E+11 | 229.9 |
|   | 3.02 | 1.80 | 410.4 | 37.8 | 39.01 | 2.99 | 1.147E+11 | 343.7 |
|   | 4.01 | 1.90 | 545.9 | 43.0 | 51.89 | 3.40 | 1.341E+11 | 456.4 |
|   | 5.02 | 2.00 | 677.6 | 49.9 | 64.41 | 3.94 | 1.435E+11 | 571.3 |
| 13 | 1.03 | 1.70 | 138.9 | 12.5 | 13.20 | 0.99 | 1.174E+11 | 117.2 |
|   | 2.02 | 1.80 | 271.4 | 23.5 | 25.80 | 1.86 | 1.220E+11 | 229.9 |
|   | 3.02 | 1.90 | 406.8 | 35.7 | 38.67 | 2.82 | 1.204E+11 | 343.7 |
|   | 4.01 | 1.90 | 542.0 | 48.2 | 51.52 | 3.81 | 1.188E+11 | 456.4 |
|   | 5.02 | 2.00 | 688.1 | 48.1 | 65.41 | 3.80 | 1.511E+11 | 571.3 |

*$A_d$ = 7.72E−05 cm$^2$

TABLE 4*

| # | Bias V | R MΩ | Signal pA | Noise pA rms | Responsivity A/W | Noise pA/√Hz | D* cm√Hz/W | Field V/cm |
|---|---|---|---|---|---|---|---|---|
| 17 | 1.03 | 1.40 | 159.2 | 18.9 | 22.04 | 1.49 | 1.074E+11 | 141.5 |
|   | 2.02 | 1.50 | 312.4 | 34.7 | 29.69 | 2.74 | 9.511E+10 | 277.5 |
|   | 3.02 | 1.60 | 477.6 | 41.5 | 45.40 | 3.28 | 1.216E+11 | 414.8 |
|   | 4.01 | 1.60 | 631.7 | 53.6 | 60.05 | 4.24 | 1.245E+11 | 550.8 |
|   | 5.02 | 2.00 | 785.4 | 62.3 | 74.66 | 4.93 | 1.332E+11 | 689.6 |
| 21 | 1.03 | 1.40 | 152.6 | 18.1 | 21.13 | 1.43 | 1.075E+11 | 141.5 |
|   | 2.02 | 1.50 | 308.2 | 34.7 | 42.67 | 2.74 | 1.132E+11 | 277.5 |
|   | 3.02 | 1.60 | 460.3 | 48.3 | 63.73 | 3.82 | 1.215E+11 | 414.8 |
|   | 4.01 | 1.60 | 605.1 | 56.4 | 83.78 | 4.46 | 1.368E+11 | 550.8 |
|   | 5.02 | 2.00 | 754.3 | 57.6 | 104.44 | 4.55 | 1.670E+11 | 689.6 |
| 25 | 1.03 | 1.40 | 160.0 | 20.1 | 22.15 | 1.59 | 1.015E+11 | 141.5 |
|   | 2.02 | 1.50 | 313.7 | 33.6 | 43.43 | 2.66 | 1.190E+11 | 277.5 |
|   | 3.02 | 1.50 | 465.0 | 42.1 | 64.38 | 3.33 | 1.408E+11 | 414.8 |
|   | 4.01 | 1.50 | 637.0 | 52.1 | 88.20 | 4.12 | 1.559E+11 | 550.8 |
|   | 5.02 | 2.00 | 777.2 | 61.0 | 107.61 | 4.82 | 1.624E+11 | 689.6 |

*$A_d$ = 5.30E−05 cm$^2$

TABLE 5*

| # | Bias V | R MΩ | Signal pA | Noise pA rms | Responsivity A/W | Noise pA/√Hz | D* cm√Hz/W | Field V/cm |
|---|---|---|---|---|---|---|---|---|
| 29 | 1.03 | 1.60 | 137.6 | 28.0 | 49.02 | 2.21 | 1.005E+11 | 226.9 |
|   | 2.02 | 1.70 | 266.7 | 45.9 | 95.00 | 3.63 | 1.188E+11 | 445.1 |
|   | 3.02 | 1.80 | 426.0 | 63.4 | 151.75 | 5.01 | 1.374E+11 | 665.4 |
|   | 4.01 | 1.80 | 539.5 | 59.1 | 192.18 | 4.67 | 1.867E+11 | 883.5 |
|   | 5.02 | 2.00 | 666.7 | 66.5 | 237.49 | 5.26 | 2.050E+11 | 1106.0 |
| 33 | 1.03 | 1.50 | 142.7 | 26.8 | 50.83 | 2.12 | 1.089E+11 | 226.9 |
|   | 2.02 | 1.60 | 284.1 | 41.9 | 101.20 | 3.31 | 1.387E+11 | 445.1 |
|   | 3.02 | 1.70 | 428.3 | 55.1 | 152.57 | 4.36 | 1.590E+11 | 665.4 |
|   | 4.01 | 1.70 | 542.1 | 63.1 | 193.11 | 4.99 | 1.757E+11 | 883.5 |
|   | 5.02 | 2.00 | 669.2 | 63.6 | 238.38 | 5.03 | 2.152E+11 | 1106.0 |
| 37 | 1.03 | 1.70 | 141.2 | 24.0 | 50.30 | 1.90 | 1.203E+11 | 226.9 |
|   | 2.02 | 1.80 | 281.6 | 40.5 | 100.31 | 3.20 | 1.422E+11 | 445.1 |
|   | 3.02 | 1.80 | 432.1 | 56.6 | 153.92 | 4.47 | 1.561E+11 | 665.4 |
|   | 4.01 | 1.80 | 572.5 | 56.6 | 203.94 | 4.47 | 2.069E+11 | 883.5 |
|   | 5.02 | 2.00 | 695.1 | 70.6 | 247.61 | 5.58 | 2.014E+11 | 1106.0 |

*$A_d$ = 2.06E−05 cm$^2$

TABLE 6*

| # | Bias V | R MΩ | Signal pA | Noise pA rms | Responsivity A/W | Noise pA/√Hz | D* cm√Hz/W | Field V/cm |
|---|---|---|---|---|---|---|---|---|
| 41 | 1.03 | 1.60 | 128.1 | 32.0 | 77.05 | 2.53 | 1.064E+11 | 294.9 |
|   | 2.02 | 1.70 | 249.5 | 52.9 | 150.07 | 4.18 | 1.253E+11 | 578.3 |
|   | 3.02 | 1.70 | 385.8 | 62.7 | 232.06 | 4.96 | 1.635E+11 | 864.6 |

TABLE 6*-continued

| # | Bias V | R MΩ | Signal pA | Noise pA rms | Responsivity A/W | Noise pA/√Hz | D* cmvHz/W | Field V/cm |
|---|--------|------|-----------|--------------|------------------|--------------|------------|------------|
|    | 4.01 | 1.80 | 521.4 | 61.0 | 313.62 | 4.82 | 2.271E+11 | 1148.1 |
|    | 5.02 | 2.00 | 631.1 | 71.3 | 379.60 | 5.64 | 2.352E+11 | 1437.2 |
| 45 | 1.03 | 1.50 | 134.4 | 34.2 | 80.84  | 2.70 | 1.044E+11 | 294.9 |
|    | 2.02 | 1.70 | 265.3 | 44.3 | 159.58 | 3.50 | 1.591E+11 | 578.3 |
|    | 3.02 | 1.70 | 390.5 | 57.0 | 234.88 | 4.51 | 1.821E+11 | 864.6 |
|    | 4.01 | 1.70 | 526.1 | 63.7 | 316.44 | 5.04 | 2.195E+11 | 1148.1 |
|    | 5.02 | 2.00 | 607.9 | 71.7 | 365.65 | 5.67 | 2.253E+11 | 1437.2 |
| 49 | 1.03 | 1.70 | 133.9 | 33.5 | 80.54  | 2.65 | 1.062E+11 | 294.9 |
|    | 2.02 | 1.80 | 250.6 | 44.0 | 150.73 | 3.48 | 1.514E+11 | 578.3 |
|    | 3.02 | 1.90 | 363.1 | 56.7 | 218.40 | 4.48 | 1.702E+11 | 864.6 |
|    | 4.01 | 1.90 | 481.4 | 60.4 | 289.56 | 4.78 | 2.118E+11 | 1148.1 |
|    | 5.02 | 2.00 | 596.2 | 62.4 | 358.61 | 4.93 | 2.539E+11 | 1437.2 |

*$A_d$ = 1.22E–05 cm$^2$

TABLE 7*

| # | Bias V | R MΩ | Signal pA | Noise pA rms | Responsivity A/W | Noise pA/√Hz | D* cmvHz/W | Field V/cm |
|---|--------|------|-----------|--------------|------------------|--------------|------------|------------|
| 53 | 1.03 | 1.80 | 113.0 | 41.7 | 128.76 | 3.30 | 9.912E+10 | 405.9 |
|    | 2.02 | 2.00 | 229.5 | 46.7 | 261.51 | 3.69 | 1.798E+11 | 796.0 |
|    | 3.02 | 2.10 | 306.7 | 54.2 | 349.48 | 4.28 | 2.070E+11 | 1190.0 |
|    | 4.01 | 2.10 | 391.9 | 63.7 | 446.56 | 5.04 | 2.250E+11 | 1580.2 |
|    | 5.02 | 2.10 | 465.9 | 67.4 | 530.88 | 5.33 | 2.528E+11 | 1978.2 |
| 57 | 1.03 | 1.80 | 109.5 | 38.1 | 124.77 | 3.01 | 1.051E+11 | 405.9 |
|    | 2.02 | 1.90 | 221.0 | 50.8 | 251.82 | 4.02 | 1.591E+11 | 796.0 |
|    | 3.02 | 1.90 | 312.9 | 61.1 | 356.54 | 4.83 | 1.873E+11 | 1190.0 |
|    | 4.01 | 1.90 | 416.0 | 69.6 | 474.02 | 5.50 | 2.186E+11 | 1580.2 |
|    | 5.02 | 2.00 | 478.0 | 70.3 | 544.67 | 5.56 | 2.487E+11 | 1978.2 |
| 62 | 1.03 | 1.80 | 114.7 | 38.6 | 130.70 | 3.05 | 1.087E+11 | 405.9 |
|    | 2.02 | 1.90 | 230.7 | 48.4 | 262.88 | 3.83 | 1.743E+11 | 796.0 |
|    | 3.02 | 1.90 | 333.7 | 61.2 | 380.24 | 4.84 | 1.994E+11 | 1190.0 |
|    | 4.01 | 1.90 | 452.1 | 69.8 | 515.15 | 5.52 | 2.369E+11 | 1580.2 |
|    | 5.02 | 2.00 | 490.1 | 66.0 | 558.45 | 5.22 | 2.716E+11 | 1978.2 |

*$A_d$ = 6.44E–05 cm$^2$

Equations 3 and 4 show that the response R is proportional to $V_b/l^2$. If $R1^2$ is plotted against $V_b$ for each area of detector, it may be seen that the response is fairly linear with $V_b$. However, the response at smaller detector lengths is not quite as high as expected. Closer analysis shows that a closer fit may be obtained for R $1.1^{1.86}$.

For $\lambda_{pk}$=2.5 μm, μ=550 cm$^2$/V/s (electrons), $t_1$=1 ms (can vary from 30–60,000 μs), η=0.5 (a reasonable estimate), the slope of the line should be 0.553. In fact, the measured slope is around 0.001, nearly three orders of magnitude too small. Accordingly, the theory predicts a much higher gain than is observed. This discrepancy has yet to be resolved—even the literature quotes typical values of photoconductive gain in line with the measured values. The alternative possibility of a very low quantum efficiency is highly unlikely.

Incidentally, the quantum efficiency cannot be directly determined. It might be thought that it could be determined by comparing theoretical to measured D*. The theoretical background limited infrared photodetector (BLIP) D* cannot be used, however, since the detectors are not BLIPs. Any other theoretical evaluation of D* depends itself on gain. However, the following equations show how quantum efficiency and $t_1$ may be calculated from measured signal and noise currents and incident flux. It is assumed that the dominant noise source is g-r noise. Hence, R and D* may be calculated using equations 5 and 8. By manipulating equations, the effective carrier lifetime $t_1$ and the quantum efficiency η may be calculated as $$t_1 = \frac{p}{q\mu} \frac{wl^3}{2} \left(\frac{R}{D^*}\right)^2 \tag{9}$$

$$\eta = \frac{2hc}{\lambda} \frac{(D^*)^2}{R} \frac{1}{\rho\sqrt{wl^3}} \tag{10}$$

For example, values from the first line of data in Table 1 yield $t_1$=0.93 μs and η=1.03. The value for 72 is at least the right order of magnitude, albeit higher than might be expected.

Combining equations 4 and 8 indicates that D* is independent of detector geometry. While plotting measured D* as a function of electric field reveals that this is not the case, the maximum field with the current system will be 1V/30 μm, or 333 V/cm.

The components of detection system 20 may have a variety of forms. For example, optics 30 may include a lens, a mirror, a polarizer, and/or any other device for manipulating infrared radiation. Chopper 40 may be a shutter, a rotating blade, or any other type of device for presenting a reference scene and an actual scene to FPA 50. Detector elements 52 of FPA 50 may be Lead-Sulfide detector elements, Lead-Selenide detector elements, resistive balometer elements, or any other type of resistive detector elements. Read-out circuitry 60 may be an integrated circuit, an application specific integrated circuit, of any other type of semiconductive device. In particular embodiments, FPA 50 may be monolithically formed on a chip containing ROC 60. Data link 62 may be a bus, a wireless channel, a fiber-optic cable, or any other type of wireline or wireless link.

Figure 2:
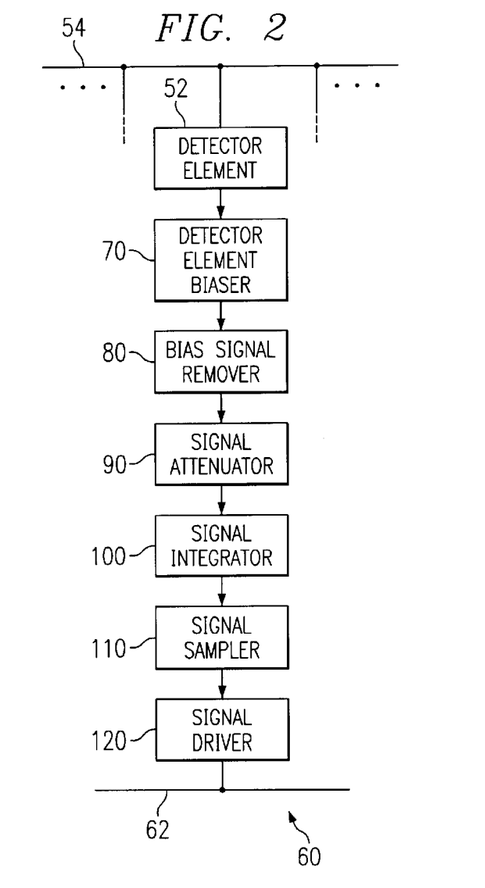
FIG. 2 illustrates one embodiment of read-out circuitry for the system in FIG. 1.

FIG. 2 illustrates one embodiment of ROC 60 for system 20. Although illustrated for only one of detector elements 52, it will be appreciated that similar components could be used for the other of detector elements 52. Thus, some or all of detector elements 52 may be active at any one time, which may significantly enhance performance. As illustrated, ROC 60 includes a detector element biaser 70, a bias signal remover 80, a signal attenuator 90, a signal integrator 100, a signal sampler 110, and a signal driver 120.

Detector element biaser 70 is controllable to adjust the bias signal to the detector element 52. Thus, when radiation impinges on the detector element 52, the total current includes two components: 1) the bias current that is present when the scene is not being presented to the detector element; and 2) a signal current corresponding to the drop in detector resistance.

Bias signal remover 80, in conjunction with chopper 40, removes the bias current by using an autozero technique. When chopper 40 allows the infrared radiation from a reference scene to impinge upon FPA 50, the current produced by the detector element 52 is stored. By storing this current, it may then be subtracted from the current produced when chopper 40 allows infrared radiation from the actual scene to impinge upon FPA 50. The difference between these currents is, therefore, the current that represents the actual scene.

While the bias removed signal could be frequency filtered in order to minimize noise, and hence increase dynamic range and performance, it may be difficult to implement a filter in a limited area and control the filter characteristics sufficiently for certain criteria. An alternative is to integrate the bias removed signal for a period of time, such as, for example, over the frame time. This allows good filter frequency response while maintaining good accuracy. Signal integrator 100 accomplishes this task. In order to avoid potential problems with the integrated signal becoming too large over the integration time, the signal is attenuated by signal attenuator 90 before being integrated.

After integration over a period of time, the signal is sampled by signal sampler 110. Then, signal driver 120 may insert the sampled signal onto data link 62. In particular embodiments, signal driver 120 may be controlled so that the signal from the detector element 52 is multiplexed with signals from other detector elements 52.

The embodiment illustrated in FIG. 2 is thought to be especially useful for two-dimensional, staring arrays, such as those used in IR cameras, because it provides several technical features. For example, the embodiment allows autozeroing of the detector bias current on a detector element by detector element basis in limited space, which makes it useful for detectors having a large number of detector elements at a relatively small pitch, such as, for example, thirty microns, which lowers the cost of the optics 30 and increases fill factor. Of course, the invention would be useful for larger pitches too. As another example, integrating the signal from the detector elements provides for an increased signal-to-noise ratio. As a further example, the embodiment allows operation without cooling of the detector elements, which simplifies operation of the system. As still a further example, in certain embodiments, the invention allows a good dynamic range, approximately sixty decibels, and, thus, will detect a wide range of incident IR radiation. As another example, the autozeroing may be accomplished without interruption of the video flow.

In certain embodiments, various components of ROC 60 illustrated in FIG. 2 may be combined, rearranged, and/or deleted. For example, signal sampler 110 and signal driver 120 may be combined into one component for transferring the integrated signal to data link 62. As another example, detector element biaser 70 may be deleted. As a further example, detector element biaser 70 does not have to be coupled between detector element 52 and bias signal remover 80.

Figure 3:
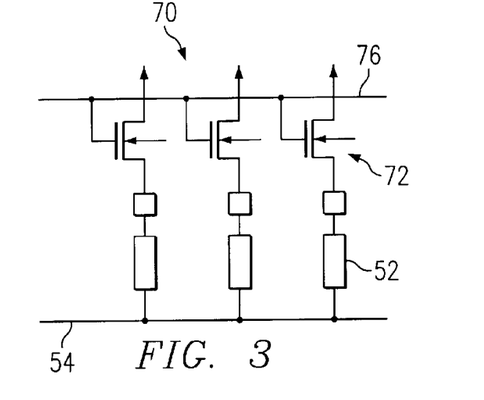
FIG. 3 illustrates one embodiment of a detector element biaser for the circuitry in FIG. 2.

FIG. 3 illustrates one embodiment of detector element biaser 70 for ROC 60. As illustrated, detector element biaser 70 includes a transistor 72 with its source coupled to the associated detector element 52, and its gate connected to a supply line 76, which provides the same potential to the detector element biasers for other detector elements 52. A detector element common line 54 provides the other potential to detector elements 52. The signal is extracted from the detector element 52 by providing a low impedance input. Transistor 72 may have its source voltage set to provide a specified potential bias applied to the detector element. In particular embodiments, the gate of transistor 72 may be set to give typically zero Volts at detector element 52 to maximize dynamic range, which allows the bias for detector element 52 to be determined by common line 54 (typically set to −1V or −2V, thereby providing a 1V or 2V bias). In certain embodiments, the drain of transistor 72 may be cascaded to minimize second order effects.

As mentioned earlier, the performance of detector elements 52 is strongly dependent on the applied bias. In implementation, however, it may be more likely that the bias will be used to optimize the signal levels rather than optimize performance, especially if the performance of the detector elements is not well defined during design.

Although FIG. 3 illustrates one embodiment of detector element biaser 70 for ROC 60, a variety of other implementations exist.

Figure 4:
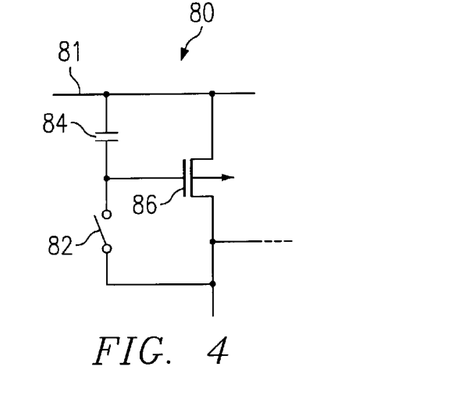
FIG. 4 illustrates one embodiment of a bias signal remover for the circuitry in FIG. 2.

FIG. 4 illustrates one embodiment of bias signal remover 80 for ROC 60. As illustrated, bias signal remover 80 includes a switch 82, a capacitor 84, and a transistor 86. Power is supplied to these components over a line 81, which typically provides a DC signal. As configured, capacitor 84 is a switched capacitor, and transistor 86 is a load transistor. In operation, switch 82 is closed when the reference scene, chopper 40 in this embodiment, is being imaged. This sets the gate voltage of transistor 86 such that the drain current matches $I_{bias}$ plus $I_{ref}$. Also during this time, a charge is stored on capacitor 84. The switch is then opened so that when the actual scene is imaged, the next stage sources the difference between the signal for the actual scene and the signal for the reference scene, $I_{act}-I_{ref}$. By storing the signal during the reference period, it is possible to display DC scene components, while at the same time eliminating bias current, which is common to both scene and reference. In effect, the output represents the difference between the scene and the reference. The effect of 1/f noise is also reduced.

Note that all noise components, such as, for example, the noise on the gate of transistor 86, which may vary the bias from sample to sample, may not be entirely removed by bias signal remover 80. In fact, a residual imbalance may be desired for certain embodiments. Thus, in particular embodiments, it may be beneficial to output the noise generated during the reference period. This noise may then be subtracted from the output signal by performing correlated double sampling, either internally or externally to ROC 60.

Although FIG. 4 illustrates one embodiment of bias signal remover 80, a variety of other implementations exist.

Figure 5:
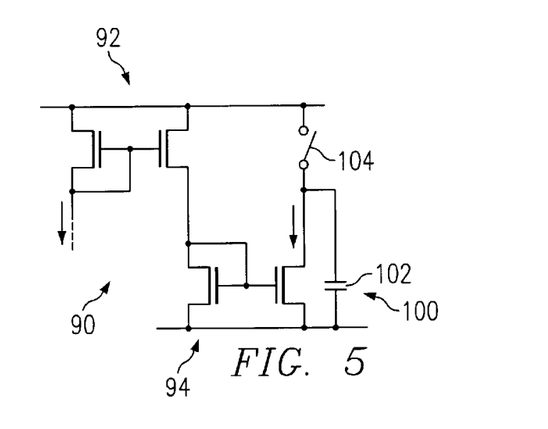
FIG. 5 illustrates one embodiment of a signal attenuator and a signal integrator for the circuitry in FIG. 2.

FIG. 5 illustrates one embodiment of signal attenuator 90 and signal integrator 100. As illustrated, signal attenuator 90 includes a current mirror 92 and a current mirror 94, and signal integrator 100 includes a capacitor 102 and a switch 104.

In particular embodiments, the widths of the transistors used in the current mirrors 92, 94 are all minimum geometry, and the lengths are scaled to provide the required attenuation. Additionally, the geometries may ensure that the transistors are always operating in the strong inversion region, otherwise gain matching between pixels may be degraded. In certain embodiments, care should be taken to ensure matching in the division factor.

As illustrated, switch 104 acts to reset capacitor 102, which integrates the signal from signal attenuator 90. The transconductance (a measure of the input current to the output voltage) for this is given by g·Cint/Tint, where g is the current scaling factor, Cint is the capacitance of capacitor 102, and Tint is the integration time. In particular embodiments, the transconductance is approximately $1e^{-8}$. Integration is advantageous in that the frequency response is set by the integration time with the noise bandwidth being 1/(2Tint), thereby reducing noise.

Although FIG. 5 illustrates one embodiment of signal attenuator 90 and signal integrator 100 for ROC 60, a variety of other implementations exist.

Figure 6:
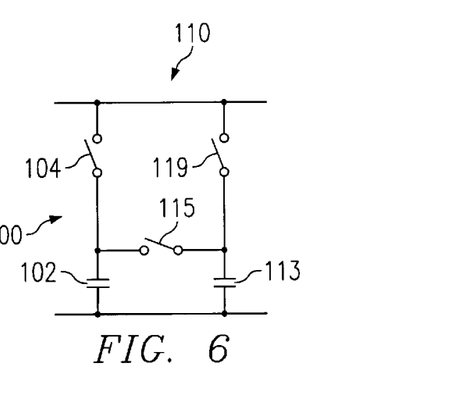
FIG. 6 illustrates one embodiment of a signal integrator and a signal sampler for the circuitry in FIG. 2.

FIG. 6 illustrates one embodiment of signal integrator 100 and signal sampler 110 for ROC 60. As illustrated, signal integrator 100 includes capacitor 102 and switch 104, and signal sampler 110 includes a capacitor 113, a switch 115, and a switch 119. The gain for signal sampler 110 is determined by the capacitance ratio $C_{102}/(C_{102}+C_{113})$. In a particular embodiment, capacitor 102 has a capacitance of 6 pF in the high gain setting, allowing a signal gain of nine-tenths.

In operation, capacitor 102 integrates the signal from signal attenuator 90. Then, capacitor 113 samples the signal stored on capacitor 102 by the activation of switch 115. Capacitor 102 is then reset by the activation of switch 104 and again begins to integrate the signal from signal attenuator 90. While capacitor 102 is integrating, capacitor 113 is transferring the stored signal to signal driver 120. Towards the end of the next frame, switch 119 is activated to clear capacitor 113 for the next signal transfer from capacitor 102. Note that this configuration of signal integrator 100 and signal sampler 110 allows correlated double sampling, mentioned earlier, to work because the charge on capacitor 113 (the sample capacitor) may be discarded after read-out.

Although FIG. 6 illustrates one embodiment of signal integrator 100 and signal sampler 110, a variety of implementations exist.

Figure 7:
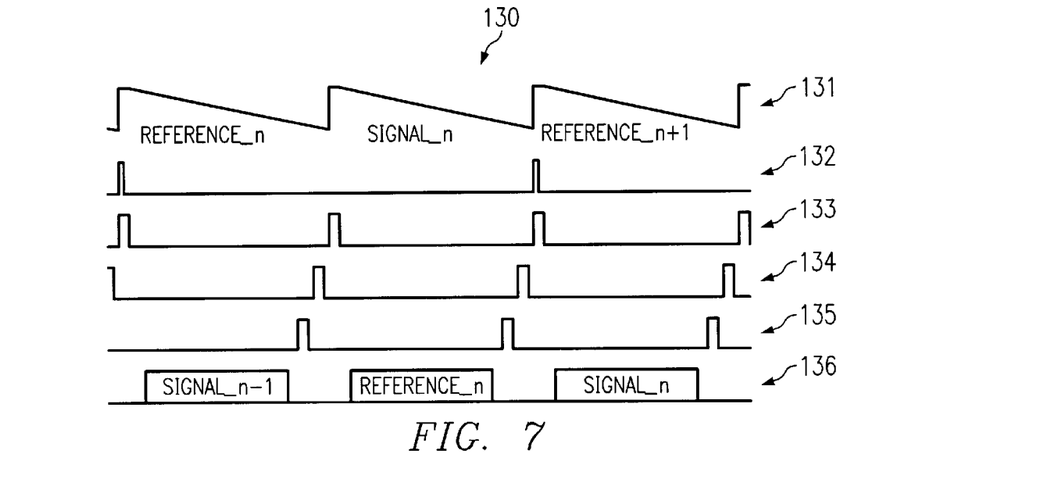
FIG. 7 illustrates one embodiment of a timing diagram for operating the circuitry in FIG. 2.

FIG. 7 illustrates one embodiment of a timing diagram 130 for operating the embodiments of detector element biaser 70, bias signal remover 80, signal attenuator 90, signal integrator 100, signal sampler 110, and signal driver 120 just discussed. Note that timing diagram 130 assumes that correlated double sampling will occur. As illustrated, timing diagram contains timing signals 131–135. Timing signal 131 illustrates the integration of signals by capacitor 102. Timing signal 132 drives switch 82 of bias signal remover 80. Accordingly, timing signal 132 dictates that switch 82 is closed for a short period at the beginning of each frame to store charge on capacitor 84 and then opened so that the charge will be maintained. Additionally, timing signal 133 drives switch 104 of signal integrator 100, timing signal 134 drives switch 115 of signal sampler 110, and timing signal 135 drives switch 119 of signal sampler signal sampler 110. Accordingly, in operation, switch 119 is activated first to clear capacitor 113, next switch 115 is activated to allow the signal on capacitor 102 to be transferred to capacitor 113, and then switch 104 is activated to clear capacitor 102 for another integration. Output signal 136 shows the output of signal sampler 110 to signal driver 120. Note that the signals being output are one step behind the signal currently be integrated and that the reference signal is actually residual noise that will be subtracted from the actual signal by correlated double sampling.

Figure 8:
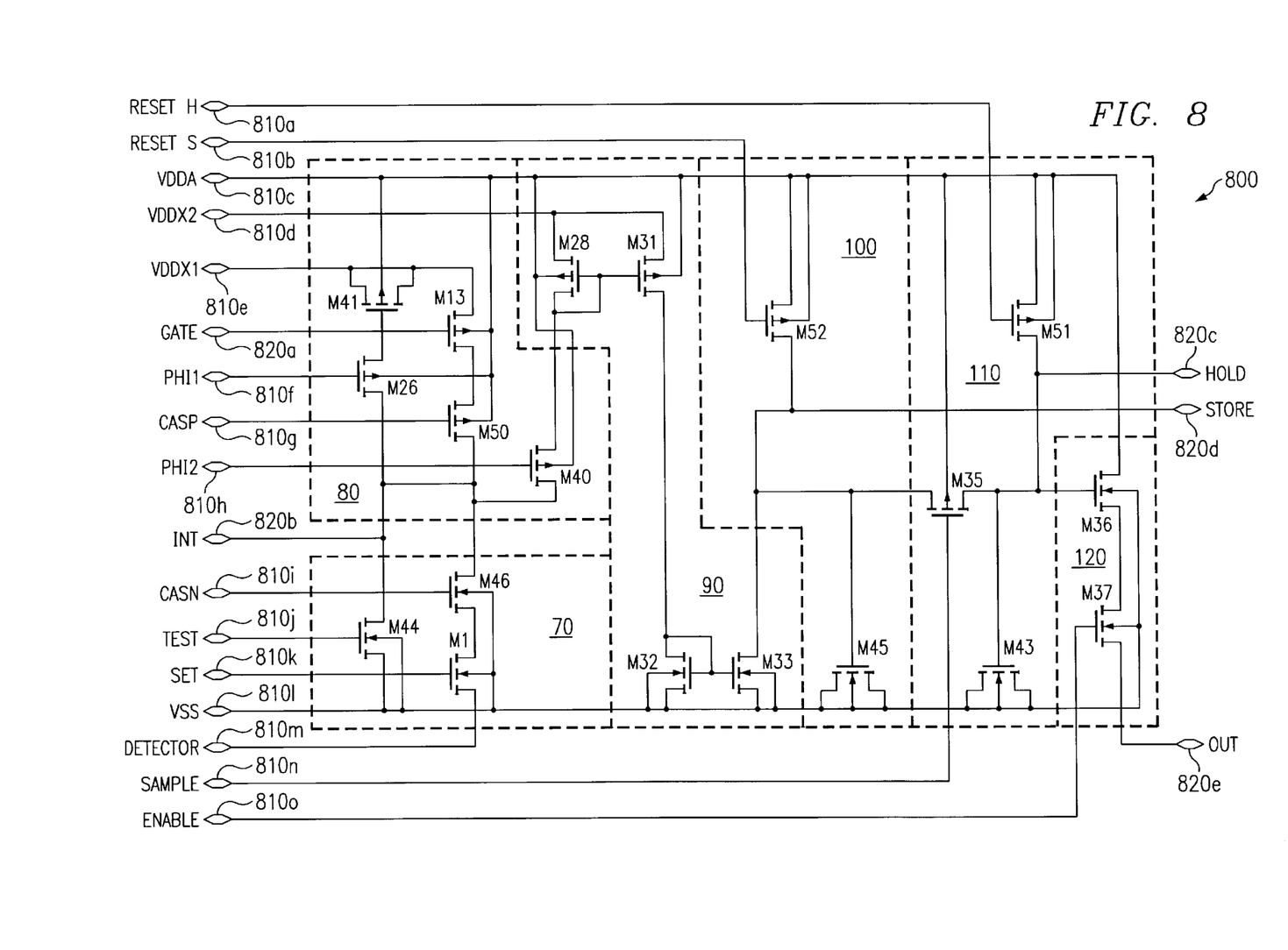
FIG. 8 illustrates one embodiment of a circuit for implementing the circuitry in FIG. 2.

FIG. 8 illustrates one embodiment of a circuit 800 for implementing ROC 60. As illustrated, circuit 800 is composed of a plurality of CMOS transistors, which may be grouped according to the functions of the components of ROC 60. The capacitors are fabricated as CMOS transistors in circuit 800 in order to achieve a high capacitance per unit area. In particular embodiments, circuit 800 may be implemented for approximately a thirty micron pitch by using a one-half micron process layout rule.

Transistors M1, M46, and M44 are part of detector element biaser 70 and, accordingly, facilitate biasing the associated detector element and receiving the signal from the detector element. In operation, transistor M1 is primarily responsible for these tasks, while transistor M46 assists in keeping the current of transistor M13 as constant as possible and, hence, acts as a cascade transistor. This helps to minimize second order effects, such as the bias current changing between actual and reference scenes. Transistor M44 provides both the bias and signal currents for wafer screening and, during normal operation, is turned off by setting its input to ground. For the illustrated embodiment, these transistors are all N-type transistors.

Transistors M13, M26, M40, M41, and M50 are part of bias signal remover 80 and, thus, facilitate removing the bias signal from the actual signal. In operation, transistor M26 acts as a switch, somewhat similar to switch 82 in FIG. 4, and transistor M41 acts as a capacitor, somewhat similar to capacitor 84 in FIG. 4. Transistor M13 performs functions similar to transistor 86 in FIG. 4 and transistor M50 holds one end of transistor M13 to help keep its current as constant as possible and, hence, acts as a cascade transistor. This helps to minimize second order effects, such as the bias current changing between actual and reference scenes. Transistor M40 disconnects the current mirrors in signal attenuator 90 during clamping of the bias current load transistor M13, so that all the current passes through that transistor. For the illustrated embodiment, all of these transistors are P-type transistors.

Using this design for bias signal remover 80 implicates several second-order effects. First, the charge injection from transistor M26 onto transistor M41 should be considered. When transistor M26 turns off, some of the charge, Qg, under the gate of transistor M26 may be transferred to the gate of transistor M41, causing a voltage change of Qg/C, and hence a current reduction of gm·Qg/C, where gm is the gate transconductance of transistor M13. This effect may be minimized by turning transistor M26 off slowly, allowing the voltage of transistor M41 to stabilize.

A second effect may be due to the parasitic gate/source capacitance in transistor M13 coupling a fraction of the gate voltage onto transistor M41. As before, the bias current will drop if a p-type transistor is used. This effect may be reduced by minimizing the voltage range of the controlling voltage so that transistor M26 goes from "just on" to "just off", although switch should be turned off sufficiently to prevent channel leakage currents.

Another factor to consider is the charge leakage from transistor M41. Inevitably there are drain/source regions associated with transistor M26. These will allow reverse bias diode leakage currents to flow. These currents are exponentially temperature dependent, so the effect may be minimized by cooling, or at least by ensuring that the operating temperature does not rise significantly above room temperature.

A further effect to consider is reset noise (kTC) on transistor M41. Linear multiplexer designs only have a pitch requirement in the cross-scan direction, allowing transistor M41 to be made arbitrarily large, thereby minimizing charge injection effects, leakage currents and reset noise. This, however, may be difficult with a two-dimensional array and, hence, the reset noise can be considerable. One solution is to output the noise during the reference scene and perform off-chip correlated double sampling digitally. This approach is used in this embodiment.

Another factor to consider is that transistor conductance modulation as the drain voltage is varied. As the drain voltage changes, the channel current changes—dI/dVds= gds. This effect can be minimized by increasing the channel length, or effectively removed altogether by cascading the transistor, thereby clamping the drain voltage. The latter approach is used here.

Still another factor to consider is power dissipation. In this embodiment, the photoconductor bias current is sourced by the read-out multiplexer, and a large two-dimensional array could dissipate a significant amount of power. Localized thermal heating from this power will result in performance degradation as the photoconductor resistance reduces. Accordingly, power dissipation should be kept low.

As discussed previously, signal attenuator 90 and signal integrator 100 source a current equal to $I_{act}-I_{ref}$. It is important to consider what happens when the actual current is less than the reference current. Fortunately, two factors mitigate against deleterious effects. Firstly, the flux from a chopper wheel at 300K, a typical operating temperature, is only a small percentage of a source at 350K, a typical scene temperature, for many detector elements. For example, the flux from the chopper is around 8% of the flux from a source at 350K for PbS, and 14% for PbSe, operating at room temperature. Secondly, the second order effects discussed earlier cause less current to be sourced by the load transistor after switching to the scene. If this current is $I_{error}$, the minimum signal current that may be integrated is $I_{act}=I_{ref}-I_{error}$. Of course, it is equally important that $I_{error}$ is not too large, otherwise the output will be always saturated. However, the design allows for the integration time to be externally controlled (by clock timing) to prevent this eventuality resulting in an unusable device.

Transistors M28, M31, M32, and M33 are part of signal attenuator 90 and, hence, facilitate attenuating the signal. In operation transistors M28, M31 act as a current mirror and transistors M32, M33 act as another current mirror. For the illustrated embodiment, transistors M28, M31 are P-type transistors, and transistors M32, M33 are N-type transistors.

Transistors M45 and M52 are part of signal integrator 100 and, accordingly, facilitate integrating the signal. In operation, transistor M45 integrates the signal from signal attenuator 90, and transistor M52 acts to reset transistor M45. For the illustrated embodiment, transistor M52 is a P-type transistor, and transistor M45 is an N-type transistor.

Transistors M35, M43, and M51 are part of signal sampler 110 and, hence, facilitate sampling the integrated signal. In operation, transistor M35 acts as a switch to transfer the signal from signal integrator 100 onto the gate of transistor M43 at the end of the integration period. While signal integrator 100 is integrating the next frame, the signal stored on the gate of transistor M43 is transferred off the chip by signal driver 120. Transistor M51 acts to reset transistor M43. For the illustrated embodiment, transistors M51, M35 are P-type transistors, and transistor M43 is an N-type transistor.

Transistors M36, M37 are part of signal driver 120 and, thus, facilitate inserting the signal onto data link 62. Accordingly, transistors M36, M37 are part of the output multiplexing tree. The output of circuit 800 is switched directly to the chip output into virtual ground, where it is converted by an external transconductance amplifier into a voltage. For the illustrated embodiment, transistors M36, M37 are N-type transistors.

Circuit 800 contains several inputs 810a–o and outputs 820a–e. Inputs 810a–b control the reset of the capacitors for integrating the attenuated signal and sampling the integrated signal. Input 810c provides substrate voltages for transistors M41, M13, M50, M28, M40, M31, M52, M35, M51, and M36. Inputs 810d–e provide a lower voltage power supply to the circuitry handling detector bias currents. This provides increased dynamic range and minimizes power dissipation. Inputs 810d–e are split such that input 810d supplies the bias circuit and input 810e supplies the first current mirror and are coupled at the input pad. This ensures that IR voltages due to varying signals do not modify the source of the bias current transistor elsewhere in the array, giving rise to undesirable cross-talk effects. In a particular embodiment, these inputs are set to 3.5V, as approved to 5V for the other circuitry. Input 810f provides a clock in synchronization with chopper 40 and, thus, is useful for determining when a reference signal and an actual signal is present for autozeroing. Input 810g is a DC voltage that facilitates holding the signal out of M13 as constant as possible by keeping the impedance of transistor M50 high. Input 810h is a clock in synchronization with the chopper 40 and steers the residual difference signal into the signal attenuator 90. Input 810i is a DC voltage that assists in holding the impedance of transistor M50 high. Input 810j is used for testing the device after manufacture and, hence, mimics the input of a detector element 52. Input 810k sets the voltage on the ROC 60 side of the detector element 52. Input 810l is a ground signal for transistors M44, M46, M1, M32, M33, M45, M43, M37, and M36 in bulk mode. Input 810m is the signal from the detector element. Input 810n instructs signal sampler 110 to sample the signal held by signal integrator 100, and input 810o instructs signal driver 120 to insert the signal onto data link 62.

Outputs 820a–e are used to monitor the performance of circuit 800 during testing and to actually output the signals. Outputs 820a–d provide monitoring of the autozero function, the sampling function, and the holding function during testing and simulation. Output 820e provides the actual output during operation.

The transistors of circuit 800 may be sized to accomplish a variety of functions, such as, for example, low transconductance, matching and/or attenuation, depending on the detector elements used. For an array of 320×256 PbS detector elements at a pitch of thirty microns, the transistors may be sized as shown in Table 8. If other detector elements were used, the bias voltage could be adjusted to achieve a similar bias current.

TABLE 8

| Transistor | Length (microns) | Width (microns) |
|---|---|---|
| M1 | 0.7 | 1.5 |
| M44 | 5.2 | 0.8 |
| M46 | 0.7 | 1.5 |
| M40 | 0.6 | 0.8 |
| M50 | 0.9 | 0.8 |
| M26 | 0.6 | 0.8 |
| M13 | 8.5 | 0.8 |
| M41 | 8.55 | 4.5 |
| M28 | 5.0 | 0.8 |
| M31 | 27.5 | 0.8 |
| M52 | 0.6 | 0.8 |
| M32 | 7.3 | 0.8 |
| M33 | 132.5 | 0.8 |
| M45 | 13.84 | 13.5 |
| M35 | 0.6 | 0.8 |
| M43 | 11.03 | 1.4 |
| M37 | 0.6 | 8.2 |
| M36 | 0.6 | 8.2 |
| M51 | 0.6 | 0.8 |

Note that these measurements result in a scaling factor of 5.0/27.5 for the first current mirror of signal attenuator 90 and of 7.3/132.5 for the second current mirror of signal attenuator 90.

Figure 9:
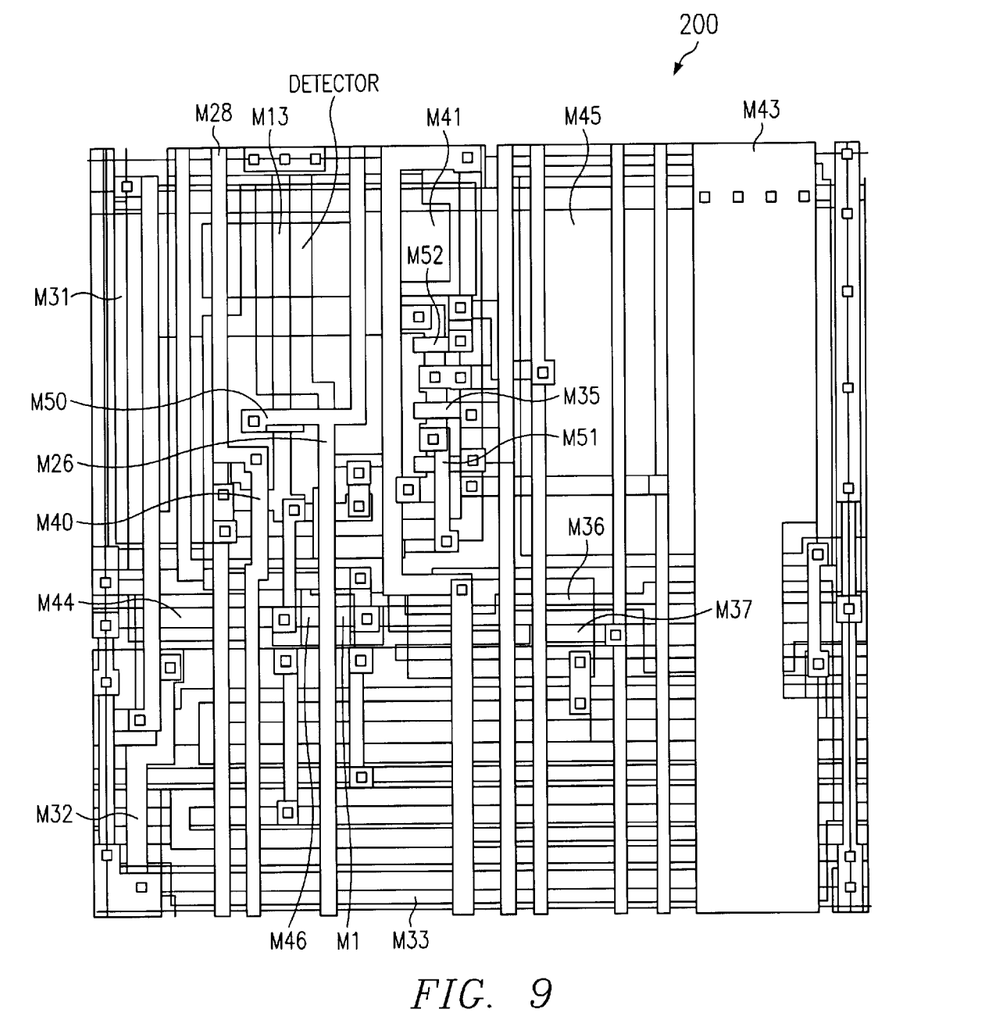
FIG. 9 illustrates one embodiment of the circuit of FIG. 8 implemented in a cell.

FIG. 9 illustrates one embodiment of circuit 800 implemented in a cell 200. In designing cell 200, it was necessary to pay particular attention to the way the cell is laid out in order to prevent undesirable parasitic coupling to sensitive nodes—in particular, the gate of transistor M13, which controls the photoconductor bias current. The layout has been designed such that the current attenuation through the current mirror may be easily modified without requiring significant layout changes as more reliable detector performance data becomes available. The figure illustrates how the gate length of transistor M28 may be easily varied. The detector contacts are 3 μm×6 μm passivation openings. To prevent the possibility of chemical damage to the aluminum tracks during monolithic detector fabrication, there will not be oxide openings in the parts (the wire bond pads will also not be opened).

In order to accommodate a thirty micron pitch, cell 200 has been designed such that adjacent cells are mirrored. A disadvantage of a mirrored structure is that an odd-even fixed pattern noise will be evident in the output data, but this may of course be corrected by the pixel gain-offset correction parameters in the normal way.

To ensure adequate performance of the design illustrated in FIG. 9, a computer simulation was performed. The transient performance analysis assumed a detector element resistance of 2.0 MΩ and a scene producing a current varying sinusoidally between 0 and 20 nA. By interpolating from the data in Tables 2–7, this is equivalent to a signal at 100° C. at a detector bias of 1V. The chopper temperature, which provides the reference signal, is assumed to be 300K, giving a signal current of 450 pA, or 3% of the 373K signal. The simulation uses a frame time (1/60 Hz) divided into two halves to give both reference and scene outputs per frame.

A close examination of the waveforms shows that a small current is being integrated even when the signal current is nominally zero. This is due to a small change in the gate voltage of the bias load transistor when switching from "autozero", as well as from thermal leakage. These effects were discussed earlier.

The output appears as a negative voltage, as expected from the output of a transimpedance amplifier. An offset to make the signal positive in value may be readily applied by subtracting a DC current from the negative input summing node.

In regards to uniformity, the current mirrors can never be perfectly matched, since there will always be threshold and conductance variations. No data is available for matching between adjacent transistors for the one-half micron CMOS process used. As a 'best guess,' the data from the ES2 0.7 μm process has been used.

$$\Delta Vt(1\sigma) = \frac{15.4}{\sqrt{w \cdot l}} \text{mV} \tag{11}$$

$$\Delta \beta = \frac{213}{\sqrt{w \cdot l}} \% \tag{12}$$

where w and l are the transistor widths and lengths in microns. Clearly, the larger the transistor area, the better the matching.

Performing a Monte-Carlo simulation on the data provided data regarding the pixel to pixel gain matching, which was expected to be worse than for arrays with larger pitches. The minimum gain matching was 0.493, the maximum was 1.64, the mean was 1.01, and the standard deviation was 0.220, which equates to 21.9%. If the pixel geometry is reduced further, to say 25 μm, for example, then pixel to pixel gain matching is expected to worsen. Reducing the attenuation factor, by lengthening the gate of M28 to 10 m, for example, will improve the matching slightly, giving a standard deviation of 19.5%. In addition, there will be gain variation due to the integration capacitor, but this will only amount to 1–2%, and so its effect will not be noticeable. The standard deviation in the response of the detectors measured in Tables 2–7 is 2.6%. This overall gain variation may be cancelled on a pixel by pixel basis in the normal way. Offset non-uniformity can be effectively eliminated by digitally subtracting reference from scene for each pixel.

The Input/Output transfer characteristic is quite linear. Over a 10% to 90% of saturation range, the maximum deviation from a best-fit straight line is 1.16. The slope of the line, approximately 43.3

$$43.3 e^6 \frac{V}{A},$$

is of course the transimpedance of the multiplexer, and is 87.2MΩ when a feedback resistance of 2 kΩ is used for the external transimpedance amplifier. This is close to the original goal of 100MΩ. The photocurrent range is typically −5nA to +25nA (when referred to the chopper reference).

Table 9 lists the simulated and calculated multiplexer noise components. Of particular interest is 1/f noise, because it was expected to be worse than an array with a larger pitch. kTC noise on the gate of the bias current load transistor, transistor M13, manifests itself as 17.47 mV rms noise at the output. This is clearly unacceptable, and is why the noise during the reference period is integrated and then subtracted from the actual signal, by Correlated Double Sampling, to remove the common reset noise level.

TABLE 9

| Noise source | Rms noise |
| --- | --- |
| FETS (Johnson + 1/f) | 592 μV |
| kTC (storage cap - 475 fF) | 92.9 μV |
| kTC (sample cap - 55.3 fF) | 272 μV |
| kTC (bias current load cap - 118 fF) | 0 μV (cancelled by external CDS) |
| | 658 μV |

By averaging and interpolating the data in Tables 2–7, a value of 2.94pA/√Hz is derived for a 30 μm square detector operating at 1V bias. Integrating over the noise bandwidth (½ Tint=60 Hz) yields 22.8pA rms. Multiplying by the transimpedance value of 85.3MΩ gives 1.94 mV. The total detector plus multiplexer noise is 2.05 mV rms. The multiplexer, therefore, has a noise factor of 5.7%.

The scene and reference data will both exhibit uncorrelated noise of 2.05 mV rms, so that the overall noise is obtained by multiplying by √2 to give 2.90 mV rms. The signal range is 1.37V, so that the signal to noise ratio (SNR) is 472 or 53 dB.

NEΔT at 295K is calculated to be 1.47K. Operating at cooler temperatures, and/or using PbSe is expected to improve this value considerably. Typical values are shown in Table 10.

TABLE 10

| Detector material | Operating Temperature (K) | NEΔT (mK) |
| --- | --- | --- |
| PbSe | 193 | 24.2 |
| PbS | 193 | 88.7 |
| PbSe | 295 | 341 |
| PbS | 295 | 1467 |

The effect of thermal leakage from the gate of transistor M13 must be carefully considered. The source/drain diffusions on the clamp switch are p-type, so that thermal leakage will cause the gate voltage to increase, thereby reducing the bias load current. This error is passed to the integrating capacitor, reducing the output level. If the leakage were to become excessive, it is possible that the storage capacitor will saturate, thereby preventing any signal current from being integrated. Table 11 shows the error current at the end of an 8.3 ms integration period as a function of operating temperature. The percentage of dynamic range is calculated by halving ΔI, since this is the average error current over the integration period. 16 nA represents the saturating signal current.

TABLE 11

| T(° C.) | ΔI | % of dynamic range (= ΔI/(2*16 nA)) |
| --- | --- | --- |
| 10 | 30.1 pA | 0.10% |
| 30 | 252 pA | 0.84% |
| 50 | 1.13 nA | 3.77% |
| 70 | 4.4 nA | 14.7% |

This analysis shows that the upper limit for satisfactory operation of the focal plane is at a focal plane temperature of approximately 50° C. In practice, it may be necessary to stabilize the focal plane temperature with a thermoelectric cooler (TEC) for the off focal plane correction coefficients to be valid. To minimize TEC power, a focal plane temperature of 30° C. is acceptable; however, in particular embodiments, cooling the focal plane to 250K may provide enhanced performance. No adverse leakage effects are predicted at this temperature.

The current flowing in the pixel cell is almost entirely the detector current. The voltage will be the multiplexer supply current (Vddx=3.5V typically) plus the detector common voltage. Assuming that the detector input is set to around zero volts, then the power dissipation per pixel (including power dissipated in the detector) will be $$P = \frac{Vbias(Vbias + Vddx)}{R_{detector}} \quad (13)$$

For a detector bias of 1V, a front-end supply voltage Vddx of 3.5V, and detector resistance of 2MΩ, then the power dissipated per cell (including power dissipated in the detector itself) will be 2.25 μW. For a 258×322 array, the total power dissipated is 187 mW, which is manageable.

Transistor M44 provides both the bias and signal currents for wafer screening. During normal operation, the transistor will be turned off by setting its input to ground. To emulate a 2.0MΩ photoconductor biased to 1V, giving 15 nA of signal, meaning that the transistor must switch between 500 nA and 515 nA, the test transistor gate needs to be set to around 1V and modulated with a mere 5 mV. While this will produce relatively poor uniformity to using two transistors, one for the bias current and one for the signal current, which require more space, it will allow transistor M44 to serve its purpose—to ensure pixel functionality.

Predicted performance for the PbS array at room temperature is summarized in Table 12.

TABLE 12

| Parameter | Value |
|---|---|
| Pixel pitch | 30 um |
| Operating Temperature (junction) | 40° C. max. |
| Mux output noise | 658 $\mu$V rms |
| NE$\Delta$T (298° C.) | 1.467 K |
| Mux noise factor | 5.7% |
| Dynamic Range | 53 dB |
| Photocurrent range | −5 nA to +25 nA |
| Linearity (0–90%) | 1.37% |
| Transimpedance | 87.2 M$\Omega$ |
| Gain uniformity (1$\sigma$) | 21.9% |
| Power dissipation | >200 mW |

Accordingly, the performance of the detector elements is in the neighborhood of the theoretical detector element performance, except for D* and Gain.

Figure 10:
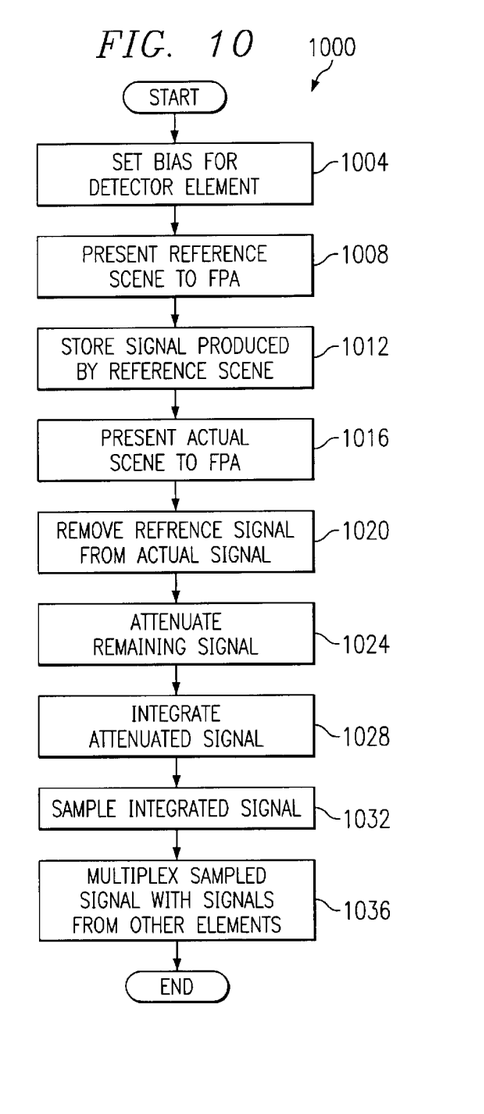
FIG. 10 is a flowchart illustrating one embodiment of a method for generating signals representing infrared radiation.

FIG. 10 is a flowchart 1000 illustrating one embodiment of a method for generating signals representing infrared radiation. As shown, flowchart 1000 illustrates the method for one detector element, but it will be appreciated that the method would be similar for other detector elements. The method begins at function block 1004 where the bias is set for the detector element. Next, the reference scene is presented to the detector element at function block 1008 and the signal produced by the reference scene is stored at function block 1012. Then, at function block 1016, the actual scene is presented to the detector element. After this, the reference signal is removed from the actual signal at function block 1020. At function block 1024, the remaining signal is attenuated. The attenuated signal is then integrated at function block 1028, and the integrated signal is sampled at function block 1032. At function block 1036, the sampled signal is multiplexed with signals from other detector elements.

Although a variety of operations have been discussed with respect to flowchart 1000, in other embodiments, operations may be added, deleted, and/or rearranged. For example, in particular embodiments, the bias does not have to be set before operations begin. As another example, in some embodiments, the reference signal is also produced as an output, allowing for correlated digital double sampling. As a further example, in certain embodiments, the sampled signal does not have to be multiplexed with signals from other detector elements.

Although a variety of embodiments have been discussed for the invention, those skilled in the part will readily recognize a variety of additions, deletions, substitutions, and/or alterations to the described embodiments. Accordingly, the following claims are intended to encompass those additions, deletions, substitutions, and/or alterations.

What is claimed is:

1. A system for generating signals representing infrared radiation, comprising:
   a plurality of infrared detector elements arranged in, a two-dimensional array, the detector elements being biased so that they produce a signal even when no infrared radiation is impinging thereon, the detector elements operable to receive infrared radiation from a reference scene and an actual scene; and
   a system for determining the output of the detector elements, the system comprising:
      a bias signal remover operable to receive a first signal representing the reference scene from one of the detector elements and a second signal representing the actual scene from the detector element and remove the bias signal from the second signal,
      a signal attenuator coupled to the bias signal remover, the signal attenuator operable to attenuate the remaining second signal,
      a signal integrator coupled to the signal attenuator, the signal integrator operable to integrate the attenuated signal, and
      a signal sampler coupled to the signal integrator, the signal sampler operable to sample the integrated signal.

2. The system of claim 1, wherein the infrared detector elements comprise Lead-Sulfide.

3. The system of claim 1, wherein the infrared detector elements are monolithically formed on a chip containing the system for determining the output.

4. The system of claim 1, wherein the pitch between the infrared detector elements is less than approximately thirty microns.

5. The system of claim 1, further comprising a detector element biaser operable to adjust the bias signal to the detector element.

6. The system of claim 5, wherein the detector element biaser comprises a transistor operable to have its source voltage set to provide a specified potential bias applied to the infrared detection element.

7. The system of claim 1, further comprising a signal driver coupled to the signal sampler, the signal driver operable to insert the sampled signal onto a data link.

8. The system of claim 1, wherein the bias signal remover comprises a switched capacitor and a load transistor.

9. The system of claim 1, wherein the signal attenuator comprises a current mirror.

10. The system of claim 1, wherein the signal integrator comprises a capacitor and a reset switch.

11. The system of claim 1, wherein the signal sampler comprises a capacitor and a reset switch.

12. The system of claim 1, further comprising a chopper operable to provide the reference scene and the actual scene to the detector elements.

13. A system for generating signals representing infrared radiation, comprising:
   means for detecting infrared radiation, the means being biased so that it produces signals even when no infrared radiation is impinging thereon, the means operable to receive infrared radiation from a reference scene and an actual scene; and
   means for determining the output of the means for detecting, comprising:

means for receiving a first signal representing the reference scene from the means for detecting and a second signal representing the actual scene from the means for detecting and removing the bias signal from the second signal, means for attenuating the remaining second signal, means for integrating the attenuated signal, and means for sampling the integrated signal.

14. The system of claim 13, further comprising means for adjusting the bias signal to the means for detecting.

15. The system of claim 13, wherein the means for detecting are monolithically formed on a chip containing the means for determining.

16. The system of claim 13, further comprising means for inserting the sampled signal onto a multiplexed data link.

17. The system of claim 13, further comprising means for providing the reference scene and the actual scene to the means for detecting.

18. A method for generating signals representing infrared radiation, comprising:

providing a reference scene and an actual scene to a plurality of infrared detector elements arranged in a two-dimensional array, the detector elements being biased so that they produce a signal even when no infrared radiation is impinging thereon;

receiving a first signal representing the reference scene from one of the detector elements;

receiving a second signal representing the actual scene signal from the detector element;

removing the bias signal from the second signal;

attenuating the remaining second signal;

integrating the attenuated signal; and sampling the integrated signal.

19. The method of claim 18, further comprising adjusting the bias signal to the detector element.

20. The method of claim 18, wherein the infrared detector elements comprise Lead-Sulfide.

21. The method of claim 18, wherein the pitch between the infrared detector elements is less than approximately thirty microns.

22. The method system of claim 18, further comprising inserting the signal onto a data link.

23. A system for generating signals representing infrared radiation, comprising:

a plurality of infrared detector elements arranged in a two-dimensional array, the detector elements being biased so that they produce a signal even when no infrared radiation is impinging thereon, the pitch between the infrared detector elements being less than approximately thirty microns;

a chopper operable to provide a reference scene and an actual scene to the detector elements; and a system for determining the output of the detector elements, the system comprising:

a detector element biaser operable to adjust the bias signal to one of the detector elements, a bias signal remover coupled to the detector element biaser, the bias signal remover operable to receive a first signal representing the reference scene from the detector element and a second signal representing the actual scene from the detector element and remove the bias signal from the second signal, a signal attenuator coupled to the bias signal remover, the signal attenuator operable to attenuate the remaining second signal, a signal integrator coupled to the signal attenuator, the signal integrator operable to integrate the attenuated signal, a signal sampler coupled to the signal integrator, the signal sampler operable to sample the integrated signal, and a signal driver coupled to the signal sampler, the signal driver operable to insert the sampled signal onto a multiplexed line;

wherein the detector elements are monolithically formed on a chip containing the system for determining the output.

24. A system for generating signals representing infrared radiation, comprising:

a system for determining the output of a plurality of infrared detector elements arranged in a two-dimensional array, the detector elements to be biased so that they produce a signal even when no infrared radiation is impinging thereon, the detector elements operable to receive infrared radiation from a reference scene and an actual scene, the system comprising:

a bias signal remover operable to receive a first signal representing the reference scene from one of the detector elements and a second signal representing the actual scene from the detector element and remove the bias signal from the second signal, a signal attenuator coupled to the bias signal remover, the signal attenuator operable to attenuate the remaining second signal, a signal integrator coupled to the signal attenuator, the signal integrator operable to integrate the attenuated signal, and a signal sampler coupled to the signal integrator, the signal sampler operable to sample the integrated signal.

25. The system of claim 24, further comprising a detector element biaser operable to adjust the bias signal to the detector element.

26. The system of claim 24, further comprising a signal driver coupled to the signal sampler, the signal driver operable to insert the sampled signal onto a data link.

* * * * *